March 2, 1926.  
P. PASSARELLI  
MARSHMALLOW CUTTING MACHINE  
Filed March 27, 1925  
2 Sheets-Sheet 1  
1,575,274
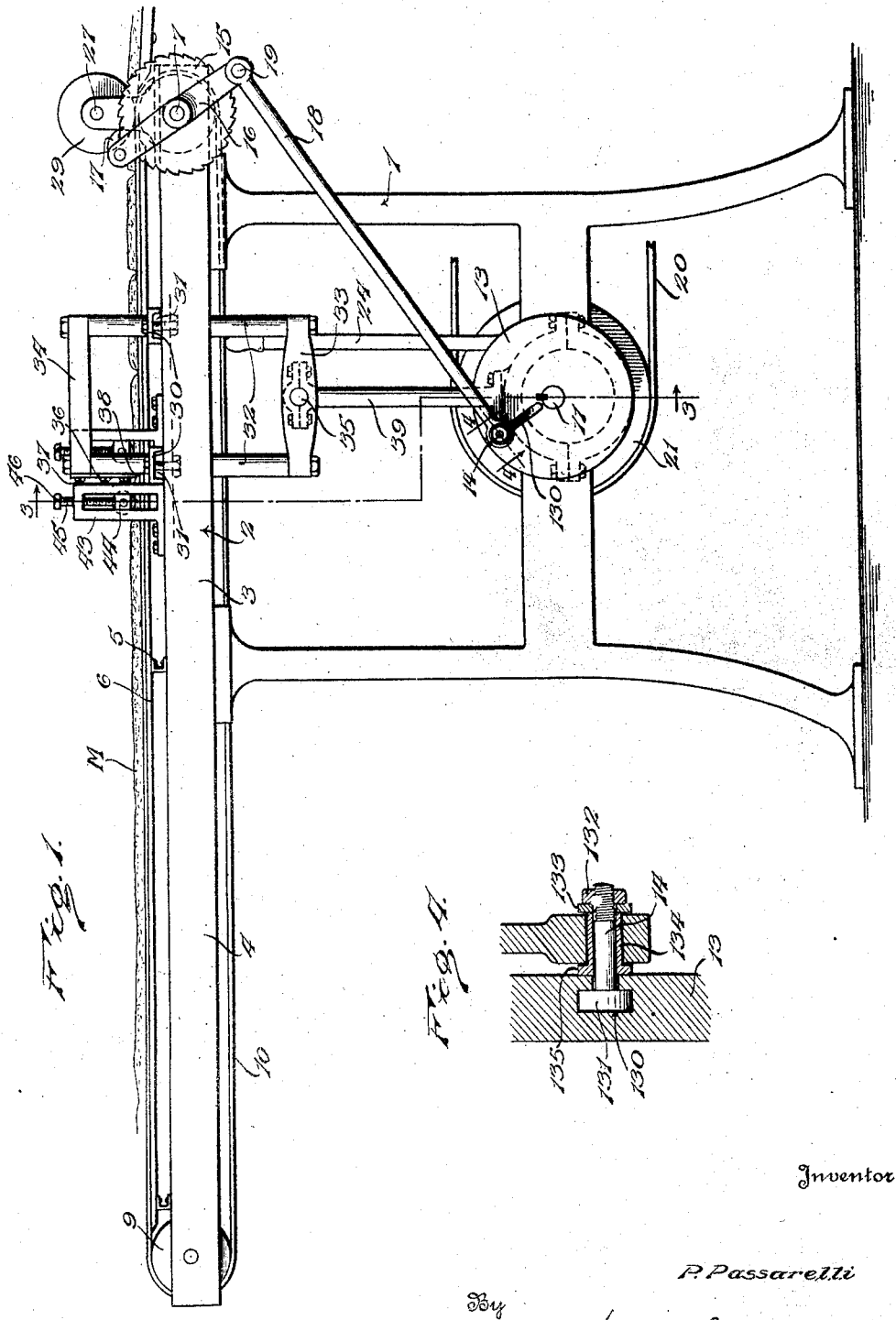

March 2, 1926. 1,575,274
P. PASSARELLI
MARSHMALLOW CUTTING MACHINE
Filed March 27, 1925 2 Sheets-Sheet 2
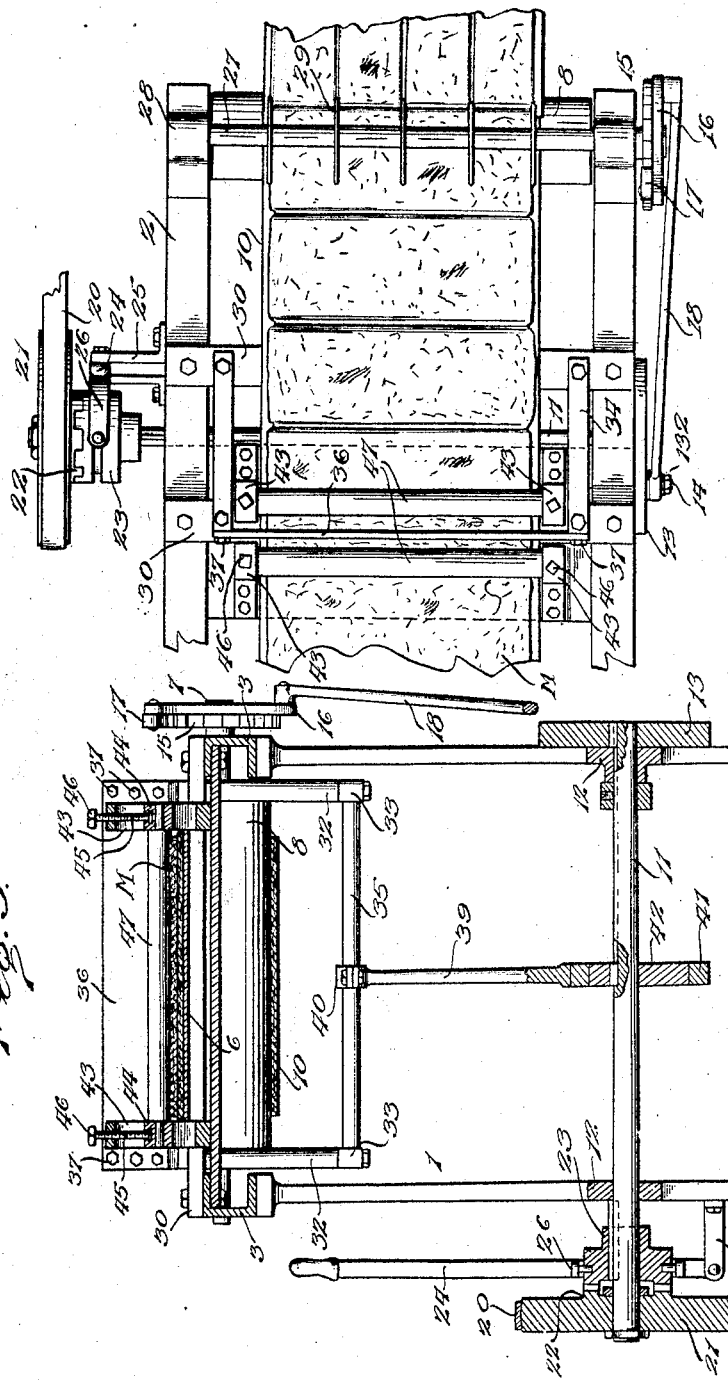
Inventor
P. Passarelli
By Lacey & Lacey,
Attorneys Patented Mar. 2, 1926.

1,575,274

UNITED STATES PATENT OFFICE.

PASQUALE PASSARELLI, OF BROOKLYN, NEW YORK.

MARSHMALLOW-CUTTING MACHINE.

Application filed March 27, 1925. Serial No. 18,862.

*To all whom it may concern:*

Be it known that I, PASQUALE PASSARELLI, a citizen of the United States, residing at Brooklyn, in the county of Kings and State of New York, have invented certain new and useful Improvements in Marshmallow-Cutting Machines, of which the following is a specification.

This invention relates to improvements in machines for cutting marshmallow paste into squares, and has as its general object to provide a machine which will perform this operation accurately and expeditiously and will require no attention on the part of the operator or attendant except to supply the paste to the machine.

Another object of the invention is to provide, in a machine for cutting marshmallow paste, means for intermittently advancing a sheet of marshmallow past a cutter operating automatically to make transverse incisions in the sheet of paste, and means effecting the simultaneous and consonant operation of the sheet feeding means and the cutting means so that the transverse incisions made in the sheet of paste will be equi-distantly spaced and accurately formed. In this connection, the invention also contemplates the provision of novel means for forming longitudinal incisions in the sheet of paste intersecting the transverse incisions and thus completing the cutting operation.

Another object of the invention is to provide means for somewhat compressing the sheet of paste as it passes and is acted upon by the means for making the transverse incisions therein, so that these incisions will be clearly defined and there will be no likelihood of the paste adhering to the blade which forms the incisions.

In the accompanying drawings:

Figure 1 is a side elevation of the machine embodying the present invention.

Figure 2 is a top plan view of a portion thereof.

Figure 3 is a vertical transverse sectional view taken substantially on the line 3—3 of Figure 1, looking in the direction indicated by the arrows.

Figure 4 is an enlarged detail sectional view on the line 4—4 of Figure 1.

The machine includes a supporting frame structure which is indicated in general by the numeral 1 and may be of any desired construction, and this frame structure supports the main frame of the machine or, more specifically, the table frame which is indicated in general by the numeral 2 and comprises two spaced parallel side members indicated by the numeral 3, which members are suitably secured to the top of the frame structure 1 at the opposite sides thereof and at one end extend a suitable distance beyond the said frame structure, as indicated by the numeral 4. Cross bars 5 are mounted at their ends upon the side members 3 of the frame 2 and these bars support a bed plate indicated by the numeral 6, which plate may be of sheet metal and of a width to extend substantially between the side members 3 and slightly elevated with respect thereto. A shaft 7 is journaled in suitable bearings upon the side members 3 of the table frame 2 at one end of said frame, and a drum 8 is fixed upon the said shaft. A similar drum 9 is mounted at the opposite ends of the frame members 3 or, in other words, at the outer ends of the extended portions 4 thereof, and a conveyer belt 10 is trained about the drums 8 and 9 and has its upper stretch led over the bed plate 6.

The main or power shaft of the machine is indicated by the numeral 11 and the said shaft is mounted in suitable bearings 12 upon the side members of the main frame structure 1, and has fixed upon it at one end, a crank disc 13 carrying a crank pin 14. A ratchet wheel 15 is fixed upon one end of the shaft 7, and a rock arm 16 is loosely mounted upon this end of the shaft beside the said ratchet wheel 15 and at its upper end pivotally supports a pawl 17 which coacts with the teeth of the ratchet wheel. A connecting rod 18 is pivotally connected at its upper end as at 19, to the lower end of the rock arm 16 and at its lower end is connected to the crank pin 14, and it will be understood at this point, that as the shaft 11 is rotated and reciprocatory motion is imparted to the connecting rod 18 through the medium of the crank pin 14, the arm 16 will be oscillated and, when oscillated or rocked in one direction, the pawl 17 will ride freely over the teeth of the ratchet wheel 15, but when the arm is rocked in the opposite direction, the pawl will coact with the teeth to rotate the ratchet wheel a part of a revolution and impart corresponding rotary motion to the shaft 7 and the drum 8 mounted thereon, thereby advancing the conveyer belt a predetermined distance over the bed plate 6. It will also be understood that this movement is an intermittent one so that a sheet of marshmallow paste, indicated by the reference letter M, disposed upon the upper surface of the upper stretch of the conveyer belt, will be intermittently advanced in the operation of the machine. The crank disc 13 is provided with a radial slot or groove receiving the head 131 of the crank pin 130 14 which may be set at any desired point in the length of the slot or groove to impart to the connecting rod 18 any desired throw. The length of each movement of the conveyer belt may thus be easily regulated so that the transverse incisions will be made at the desired intervals. The crank pin is held in its position by a nut 132 fitted on its outer end and bearing against a washer 133 which, in turn, bears against the outer end of a bushing 134 extending throughout the end of the connecting rod around the pin and having a head 135 fitting between the connecting rod and the crank disc, as shown in Figure 4.

Power is applied to the shaft 11, preferably through the medium of a belt 20 trained about a pulley 21 which is loosely mounted upon that end of the shaft 11 opposite the end upon which the crank disc 13 is mounted. The pulley 21 has a clutch face 22, and a clutch member 23 is splined upon the shaft 11 for rotation therewith and for shifting movement longitudinally thereof, into and out of coactive engagement with the clutch face 22 of the pulley. A shifting lever 24 is mounted upon a suitable bracket 25 upon the frame 1, and is provided with a yoke 26 having connection with the clutch member 23 whereby the member may be shifted in the manner stated and thus the machine may be thrown into and out of operation.

In order that longitudinal incisions may be made in the sheet of marshmallow paste as the sheet is advanced by the conveyer belt 10, a shaft 27 is freely rotatably mounted at its ends in suitable bearings 28 upon the forward ends of the side members 3 of the table frame 2 and above and parallel to the shaft 7, and rotary blades or cutters 29 of circular form are fixed upon the said shaft 27 at suitably spaced intervals and ride in peripheral contact with the upper stretch of the conveyer belt 10 where it passes over the roll or drum 8. Thus, as the sheet of paste is carried, by the conveyer belt, over the roll 8, the circular blades 29 will form longitudinal incisions in the sheet, the blades being rotated through their peripheral contact with the moving upper stretch of the conveyer belt.

In order that transverse incisions may be made in the sheet of marshmallow paste, before the longitudinal incisions are made, means is provided which will now be described. A pair of bars 30 are secured upon the upper sides of the side members 3 of the frame 2 of the machine and extend transversely between these bars and beneath the bed plate 6, and support bearings 31 in which are vertically slidably mounted pairs of rods 32, one pair of rods being located at each side of the frame 2. The rods 32 of each pair are connected at their lower ends by a cross head 33 and at their upper ends by a cross head 34, and a shaft 35 extends between and is journaled at its ends in the cross heads 33. The said rods 32 and the cross heads 33 and 34 comprise the side members of the cutter head of the machine, and a blade 36 is secured at its end edges by bolts 37, to the rear sides of the said side members of the cutter head, or, in other words, the sides thereof which are presented toward the drum 9, the blade extending transversely between the side members of the cutter head and occupying a vertical plane and having its lower edge beveled to form a cutting edge indicated by the numeral 38. A connecting rod 39 is journaled by a bearing 40 to the intermediate portion of the shaft 35 and the lower end of this rod is connected to the ring 41 of an eccentric. The disc of the eccentric is indicated by the numeral 42 and is fixed upon the shaft 11 at the intermediate portion thereof, and it will now be evident that as the shaft 11 rotates, the cutter head comprising the side members and the blade 36, will be vertically reciprocated so that the blade will be intermittently moved downwardly to bring its cutting edge 38 into contact with the upper surface of the upper stretch of the conveyer belt 10, thereby forming transverse incisions in the sheet of marshmallow paste supported by the said stretch of the belt. In practice, the arrangement of the parts will be such that the arm 18 will be rocked in a direction to impart rotary motion to the ratchet wheel 15 and advance the upper stretch of the conveyer belt 10 longitudinally over the surface of the bed plate 6, while the blade 36 is moving upwardly and starts on its downward travel, the arm 16 being rocked in the reverse direction, and the ratchet wheel 15 and conveyer belt 10 remaining idle while the blade is completing its downward stroke and is forming the incision in the sheet of marshmallow paste. Thus, the mechanism will operate to automatically effect the formation of transverse incisions in the sheet of marshmallow paste along equi-distantly spaced lines, and the knives 29 will operate automatically to form longitudinal incisions in the said sheet, so that squares of the marshmallow paste will be delivered from the machine in the operation thereof.

In order that the sheet of marshmallow paste may be compressed or compacted and thus reduced to inform thickness, as it passes the cutting blade 36, a pair of vertical guides 43 is mounted at each side of the machine upon the side members 3 of the table frame and in planes in front and in rear of the vertical plane occupied by the blade 36. Bearing blocks 44 are slidably mounted in the guides 43 and adjusting screws 45 are swiveled at their lower ends in the blocks and threaded at their upper portions through the upper ends of the said guides, these screws being provided with heads 46 at their upper ends whereby they may be adjusted to vertically adjust the blocks. Presser rolls 47 are rotatably journaled at their ends in corresponding ones of the bearing blocks 44 and are, in this manner, supported above the upper stretch of the conveyer belt 10, one of the rolls being located in advance of the blade 36 and the other in rear thereof. It will be evident at this point and by reference to Figure 1 of the drawings, that by adjusting the screws 45, the rolls may be adjusted so as to exert pressure upon the sheet of marshmallow paste drawn beneath them in the travel of the upper stretch of the conveyer belt so that the paste will be compressed to a desirable degree substantially at the time it is acted upon by the blade 36 to form the transverse incisions therein. By thus compressing or compacting the paste at this period in the treatment thereof, the incisions made by the blade 36 are more accurately and evenly formed and there is less likelihood of the paste adhering to the blade and being lifted by the blade when the blade moves upwardly. Likewise, the rolls 47 serve to compress the paste to uniform thickness so that the squares cut from the sheet of paste will be more uniform than if the rolls were not employed.

Having thus described the invention, what I claim is:

1. In a machine for cutting a sheet of confection paste into pieces of uniform size, a conveyer belt for supporting and advancing the sheet, a cutter including a blade movable vertically into and out of cooperative relation to the belt to cut the sheet transversely of its line of travel, means for reciprocating the cutter, compressing rollers extending across the sheet in advance of and to the rear of said blade, and means for imparting intermittent movement to the belt in consonance with the operation of the cutter.

2. In a machine for cutting a sheet of confection paste into pieces of uniform size, a conveyer belt for supporting and advancing the sheet, means supporting the upper stretch of the conveyer belt, a cutter including a blade movable vertically into and out of cooperative relation to the said upper stretch of the belt for cutting the sheet transversely of its line of travel, means for operating the cutter, compressing rolls supported above the said upper stretch of the belt at opposite sides of the blade and adjacent thereto and constituting means for compressing the sheet at its portion which is acted upon by the blade in the cutting operation, and means for imparting intermittent movement to the belt in consonance with the operation of the cutter.

3. In a machine for cutting a sheet of confection paste into pieces of uniform size, a frame including side bars, spaced drums rotatably mounted between said side bars, a conveyer belt trained about the drums for supporting upon its upper flight a sheet to be cut, cross bars carried by said side bars and extending beneath the upper flight of said belt, a cutter head comprising spaced side members each including vertically disposed posts slidably extending through openings in said side bars at opposite sides of the upper flight of the conveyer belt, crossheads connecting the upper and lower ends of said posts, a cutting blade extending between and secured to said side members and movable vertically with the side members into and out of relation for forming transverse cuts in a sheet of confection paste carried by the upper flight of said belt, a shaft connecting the lower crosshead of said side members, a drive shaft, a pitman extending between the shafts and connected therewith for imparting reciprocatory movement to the said head, means actuated from said drive shaft to effect intermittent travel of the conveyer belt, and means for forming longitudinally extending cuts in the sheet of confection paste as it is moved by said belt.

In testimony whereof I affix my signature.

PASQUALE PASSARELLI. [L. S.]